Dec. 28, 1965   J. C. LAUGHLIN   3,225,790
WATER SOFTENER VALVE WITH FAST RINSE MEANS
Filed Jan. 14, 1963   2 Sheets-Sheet 1

INVENTOR.
James C. Laughlin
BY
Attorney

United States Patent Office 3,225,790
Patented Dec. 28, 1965

3,225,790
WATER SOFTENER VALVE WITH FAST
RINSE MEANS
James C. Laughlin, Iowa City, Iowa, assignor, by mesne
assignments, to Jack F. Shabel, Iowa City, Iowa
Filed Jan. 14, 1963, Ser. No. 251,338
1 Claim. (Cl. 137—599.1)

The present invention relates to control valves of the type utilized in water treatment apparatus, particularly water softening apparatus, and more specifically concerns improvements in their fast rinse operation.

While not limited thereto, the invention is most directly concerned with such valves for use in household water softening equipment. The latter is a well known art and essentially, though many different variations thereof exist, comprises passing the hard or untreated water through a bed of a suitable softening agent, generally a zeolite. Means are usually provided to regenerate the latter by passing a brine solution therethrough followed by a rinse with untreated water in order to flush away excess brine and the calcium or magnesium ions removed from the untreated water during the prior softening cycle. In a typical household installation, the zeolite is contained in a treatment or mineral tank into which untreated water is piped and from which the softened water flows to service. A second tank contains a brine solution and usually a float mechanism or equivalent control by means of which the quantity of brine withdrawn for a particular regenerative cycle is governed. A control valve is customarily provided, to which the mineral and brine tanks, as well as the hard water and service supply lines, are connected and by which the flow paths are altered from those for the softening cycle to those for the brining and rinse cycles. Such a valve may be wholly manually operated, or semi-automatic or fully automatic in operation, in the latter cases a timing mechanism being usually provided to actuate, partially or wholly, a shift of the valve to its regenerative and rinse positions after predetermined period of normal operation. It is with the fully automatic type of such valves that the present invention is chiefly concerned, though features of it are equally adaptable to valves of the manual or semi-automatic type.

Control valves of the type to which the invention relates customarily use an injector assembly by which the brine is drawn from the brine tank and passed through the mineral tank during the regenerative period. For this purpose the incoming untreated water is diverted from its normal path through the valve and directed through the injector assembly in order to create the necessary vacuum to bring the brine solution up from its tank. In many cases a separate, fast rinse cycle after brining, and sometimes before as well, is desirable. However, if the passage through the injector assembly is also utilized for the passage of the rinse water, the restriction, particularly that owing to the nozzle of the injector, is so great that it is impossible to achieve a flow rate of water sufficient to provide a fast rinse. In order to overcome this difficulty some valves are provided with an additional passage bypassing the injector and controlled by a valve which, when the brine cycle has ceased, opens, thus increasing the flow for a fast rinse. However, this arrangement has one drawback. As a result of the opening of the bypass passage, substantially full line pressure is present in the mineral tank during the rinse, inasmuch as the fast rinse flow control device is customarily placed downstream of the mineral tank. It is advantageous for rinsing purposes that there be a pressure drop upstream of the mineral tank so that air and other gases trapped in the incoming hard water are released to act to expand the mineral bed, resulting in a fuller and more satisfactory rinse thereof, especially when the direction of the rinse water through the mineral tank is the reverse of that of the hard water during normal service. In the co-pending application of Richard G. Thompson, S.N. 237,039 filed November 13, 1962, and owned by the assignee of the present invention, the throat portion of the injector is utilized also as the fast rinse flow control in order to produce a suitable pressure drop upstream of the mineral tank, the downstream end of the fast rinse bypass being reintroduced between the nozzle and the throat of the injector, instead of downstream of the throat as is current practice. The present invention eliminates the need for a separate fast rinse bypass passage by utilizing a nozzle whose downstream end during the fast rinse cycle is axially moved off an annular valve seat by a solenoid in order to provide an orifice of greatly increased cross-sectional area compared with that of the nozzle passage itself. Accordingly, the latter is thereby bypassed and an increased flow of water becomes available for fast rinse on the one hand, while on the other the injector throat can still function both as a throat and as the fast rinse flow control. Additionally, the cost and complexity of the valve are reduced inasmuch as simpler castings are required as well as assembly of fewer parts.

It is, therefore, the chief object of the present invention to provide a valve of the kind described with means to bypass the injector nozzle thereof by movement of the latter in order to permit increased flow for fast rinse purposes.

A further object of the present invention is the provision of a valve of the kind described with an injector nozzle normally seated in order to permit flow therethrough only, but moveable from its seat by means of a solenoid in order to bypass the nozzle and increase flow into the injector throat for fast rinse purposes.

An additional object of the present invention is to provide a valve of the kind described with an injector nozzle forming with the injector passage a valve which is normally closed but opened by axial movement of the nozzle by means of a solenoid in order to permit flow to the injector throat to bypass the nozzle passage for fast rinse purposes.

Other and further features, objects and advantages of the present invention will become apparent from the preferred form thereof heeafter described and shown in the accompanying drawings in which.

*General description*

Figure 1:
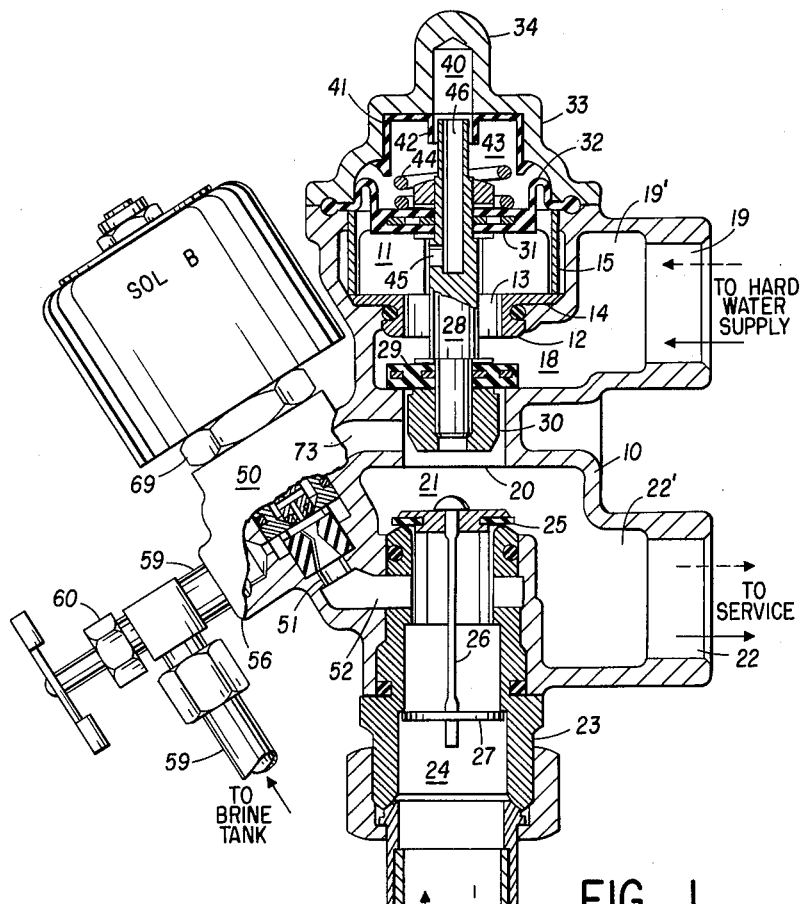
FIGURE 1 is a vertical section through a valve according to the present invention, illustrating the valve during normal service.

In its preferred form, as shown in the accompanying drawings, the valve according to the present invention is contained essentially in a single, elongated casting or housing 10 of brass, for instance, although it could be assembled from several separate castings, or even from suitably connected pipes or other conduit material assembled in conjunction with the mineral and brine tanks. Housing 10 is provided at its upper end with a generally cylindrical chamber 11 open at its top and provided at its bottom with an axially aligned cylindrical opening into which is seated an annular bushing 12 to form a cylindrical valve port 13. The upper end of bushing 12 is flanged to form a floor 14 for chamber 11 and its outer periphery receives the lower end of a thin wall bushing 15 having portal openings 16 spaced thereabout.

Portals 16, in turn, connect chamber 11 with a laterally facing untreated water outlet port 17 through passage 17'. Port 13 opens axially into a lower cylindrical inlet chamber 18 communicating with a laterally facing untreated water inlet port 19, at right angles to port 17, through passage 19'. In the floor of chamber 18 an additional cylindrical valve port 20, axially aligned with port 13, communicates with a treated water chamber 21 therebelow and the latter, in turn, with a laterally facing treated water outlet port 22, directly below port 19, through passage 22'. Port 20, chambers 11, 18 and 21, their respective ports 17, 19 and 22 and connecting passages 17', 19' and 22' are all preferably cast integrally with housing 10. The lower end of the latter is fitted with a sleeve 23 forming a vertical treated water inlet passage 24 axially aligned with ports 13 communicating with chamber 21 thereabove through a check valve 25. The latter engages a seat on the inner end of sleeve 23 and is maintained thereon by a resilient member 26 secured in tension thereto and to a spider 27 located by a downturned shoulder in sleeve 23.

Ports 13 and 20 receive a vertical plunger 28, operable axially thereof, whose upper ends extends above housing 10 and adjacent whose lower end is secured a cylindrical bib washer 29 in chamber 18. The lower and upper horizontal faces of ports 13 and 20, respectively, in chamber 18 are machined to form opposed valve seats for the opposite end faces of washer 29, the latter being sufficiently shallow so that it may alternately open and close ports 13 and 20 upon vertical movement of plunger 28. Below washer 29 the lower end of plunger 28 is provided with a plunger guide nut 30 fitting loosely within port 20. Adjacent the upper end of plunger 28, a flexible plunger operating diaphragm 31, provided with an annular fold or wrinkle 32 therein, spans the top face of chamber 11 and is fixed to plunger 28, thus closing chamber 11. Diaphragm 31 is secured to housing 10 by being clamped between it and a hollow end cap 33 provided with an upstanding, centrally located boss 34 having a laterally extending stub 35 bored to form a lateral drain passage 36 and a drain valve port 37. The latter receives the upstream end of a normally closed drain valve 38, operated by a solenoid A, and provided with a drain line fitting 39 at its downstream end. The upstream end of drain passage 36 communicates with a vertical drain chamber 40, formed integrally with boss 34, and spacedly receiving the upper end of plunger 28. The upper, inner end of cap 33 receives an inverted cup-like dielectric insulator 41, bored to receive the upper end of plunger 28, and provided with an annular lip 42 in order to form a loose fitting upper guide for plunger 28. Diaphragm 31 and cap 33 thus together form a closed plunger operating chamber 43 in which is positioned a compressible helical spring 44 surrounding the upper end of plunger 28 therein and operative between cup 41 and the upper face of diaphragm 31 in order normally to urge plunger 28 downwardly and maintain port 20 closed. The portion of plunger 28 in chamber 11 is bored radially to form a relatively small passage 45 which opens in turn into the lower end of a relatively larger passage 46 axially bored in the upper end of plunger 28, thus providing communication between chambers 11 and 43, and between the latter and chamber 40 through the space between the upper end of plunger 28 and lip 42.

*Injector and fast rinse assembly*

Housing 10 is additionally provided with an integral, generally rectangular injector boss 50 inclined upwardly from the region of chamber 21 on the opposite side of housing 10 from ports 19 and 22. Boss 50 is longitudinally bored to provide an inclined passage 51 which in turn opens at its lower end into a lateral passage 52 communicating with chamber 24 through the wall of sleeve 23. A first counterbore above passage 51 receives an injector throat 53 opening into passage 51 and a second counterbore above the first receives a cylindrical nozzle cage 54, axially aligned with throat 53 and having its lower face spaced above the upper end of the latter by means of several upstanding cylindrical stools 55 peripherally spaced around the upper face of throat 53 and formed integrally therewith in order to form a cylindrical suction chamber 56 therebetween. On its side remote from housing 10 boss 50 is provided with an integral, laterally facing extension 57 having a brine inlet port 58 therein opening into chamber 56 by means of an inlet passage 58', the axis of the latter both lying in a plane normal to the axis of throat 53 and preferably also tangential to the intersection of that plane with the wall of chamber 56 for the reasons described in the aforesaid application of Richard G. Thompson. Port 58 in turn is connected to a brine line 59 leading from the brine tank (not shown) in which may be interposed a manually operated valve 60.

Nozzle cage 54 is axially bored to provide a nozzle chamber 61, the lower wall portion of which converges in order to form a conical valve seat 62 opening axially into chamber 56 therebelow through an orifice 63 having a greater cross sectional area than that of throat 53. Chamber 61 spacedly receives an injector nozzle 64, mounted axially thereof, whose lower wall portion converges in order to cooperate with valve seat 62, being also provided for that purpose with an annular valve washer 65. Nozzle 64 is diametrically bored adjacent its lower end to form a laterally extending nozzle inlet passage 66 intersecting in turn a nozzle passage 67 bored axially upwards of nozzle 64 from its lower end. The upper end of the latter is suitably secured to the armature assembly 68 of solenoid B so that the former will, upon activation of solenoid B, be upwardly moved, axially of chamber 61, in order in turn to move washer 65 off its seat 62 and provide communication directly between chambers 56 and 61 through orifice 63, thus bypassing nozzle passages 66 and 67. The upward movement of nozzle 64 afforded by solenoid B must, of course, be sufficient to open orifice 63 to the extent necessary in order to provide a substantially greater fast rinse flow therethrough to chamber 56 than is provided thereto through nozzle passages 66 and 67 during the regenerative cycle. Solenoid B itself is mounted to boss 50 by means of a suitable annular plug 69, through which nozzle 64 and armature 68 operate axially, threaded into a third counterbore in boss 50 at its upper end. The lower end of plug 69 abuts the upper annular face of cage 54 in order to secure the latter and throat 53 within boss 50. Finally, the inner wall of boss 50 adjacent the upper end of cage 54 is radially relieved to form an annular inlet chamber 70 communicating with nozzle chamber 61 by means of an inlet passage 71 diametrically bored through the exposed outer wall of cage 54. The opposite, outer ends of passage 71 are provided with a filter thereacross in the form of a cylindrical band of screen 72 circumventing the exposed outer wall of cage 54 in inlet chamber 70.

*Operation*

Figure 2:
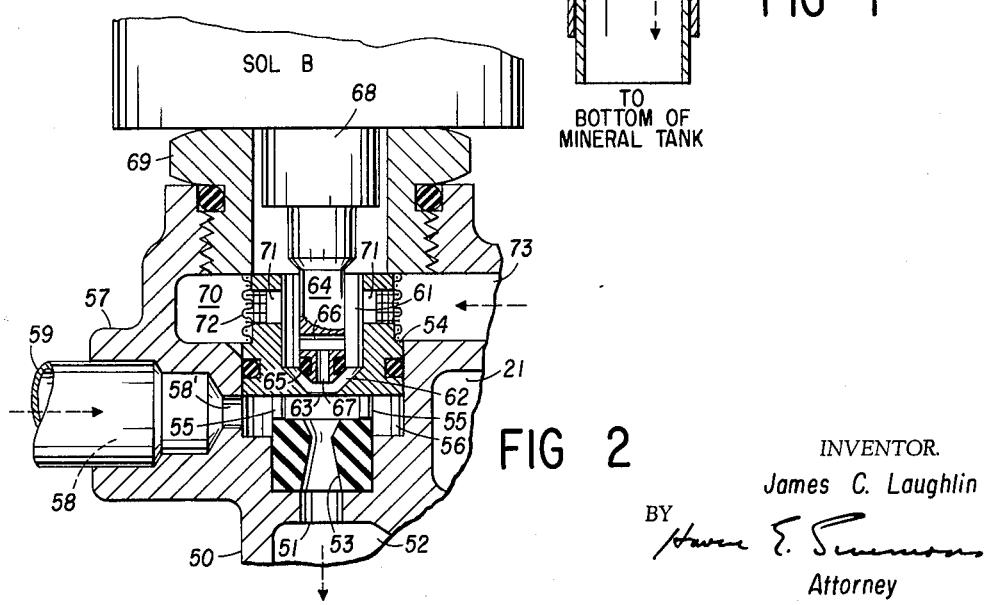
FIGURE 2 is an enlarged vertical section through a portion of FIGURE 1, illustrating the raised position of the injector nozzle assembly during the fast rinse cycle.
Figure 3:
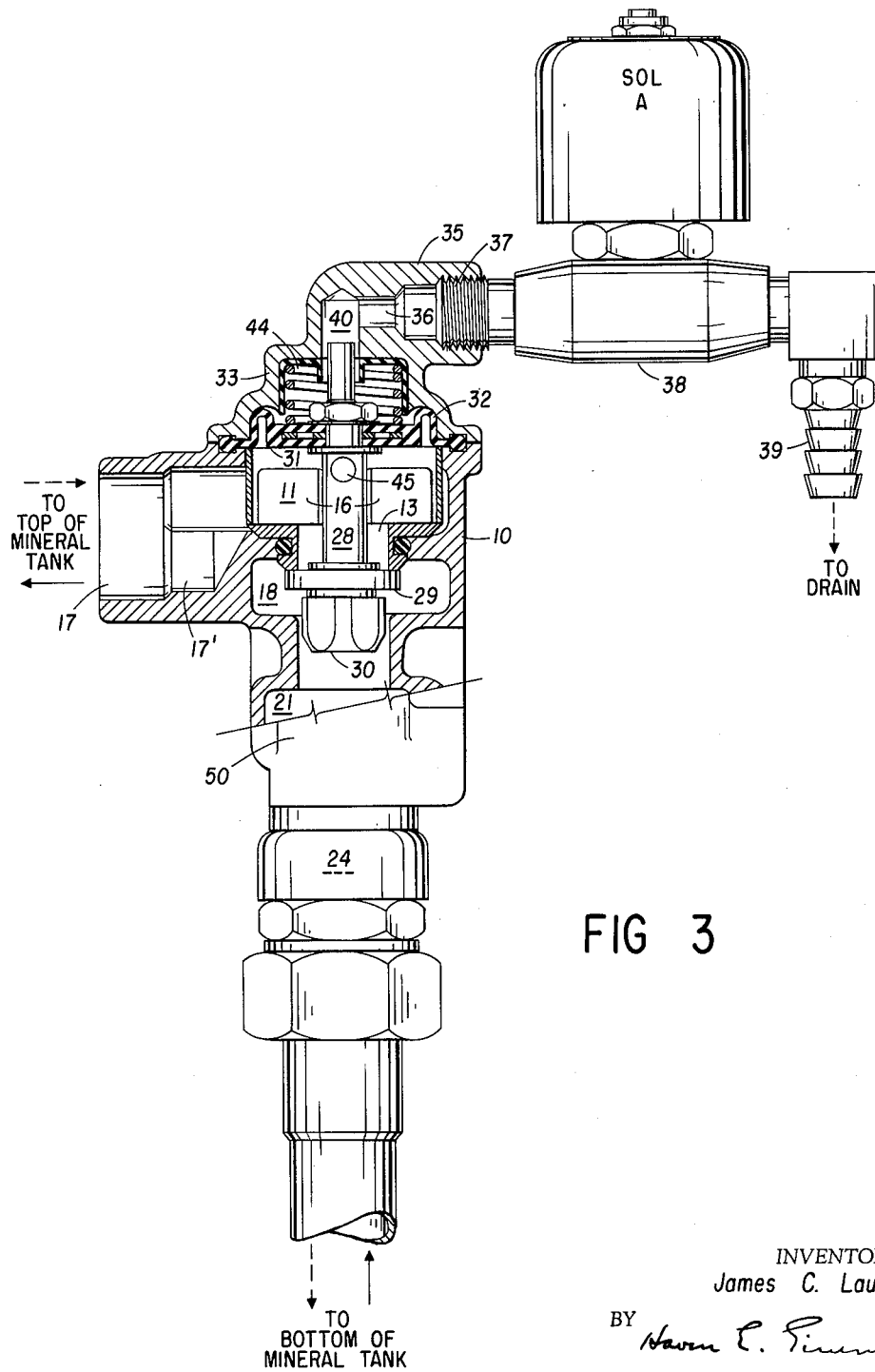
FIGURE 3 is a view, partly in section, similar to that of FIGURE 1 but taken at right angles with respect thereto, and illustrating the valve during the regenerative cycle and fast rinse cycles.

Since the interconnections of valves of the basic type of the present invention with the mineral and brine tanks are well known, it is unnecessary to illustrate or to describe them here in detail. The mineral and brine tanks themselves, and the control valve in the brine tank itself, may be of any well known, conventional construction. In any event, such tanks, as well as their interconnections, are described in many patents to which reference may be made if desired.

a. *Normal service.*—In FIGURES 1 and 3 of the drawings the solid arrows represent the direction of fluid flow during normal service and FIGURE 1 in particular illustrates the position of plunger 28 and bib washer 29 when the valve is in normal service. During this phase solenoids A and B are inactive so that drain valve 38 is closed, nozzle 64 is on its seat 62 (FIGURE 1) and plunger 28 is biased by spring 44 to the bottom of its stroke so that bib washer 29 closes port 20. Hard or untreated water enters chamber 18 through port 19 and passage 19′, passes up through port 13 into chamber 11 from whence it is carried through portals 16 and outport 17 to the distributor at the top of the mineral tank. A portion of the water in chamber 11 enters passages 45 and 46 into chamber 43 above diaphragm 31, thus equalizing the pressure on both sides of the latter so that spring 44 maintains bib washer 29 in its position closing port 20. Water passing through the mineral tank has its calcium and magnesium ions exchanged for the sodium ions of the zeolite and emerges from the bottom of the mineral tank and enters chamber 24. Its pressure forces check valve 25 upwards, thus permitting the water to flow into chamber 21 and out to port 22 through passage 22′ to service. Since there is some pressure drop in the system, the pressure of the water in chamber 21 upon the lower side of bib washer 29 is less than that on its upper side in chamber 18, thus insuring that port 20 remains closed.

b. *Regeneration.*—The broken arrows in FIGURES 1, 2 and 3 illustrate the direction of flow during the regenerative phase. A suitable timing mechanism (not shown) of any conventional nature is connected to selectively energize solenoids A and B at predetermined times for regeneration of the mineral tank. When that time, generally in the early hours of the morning, arrives the timing mechanism first energizes solenoid A, thus opening drain valve 38. Water from chamber 11 through passages 45 and 46, and from chamber 43 between the upper end of plunger 28 and lip 42, flows into drain chamber 40 and thence to drain 39 through passage 36 and drain valve 38. The flow of water from chamber 43, and from chamber 11 through the relatively small passage 45, produces a pressure drop reducing the pressure in chamber 43 above diaphragm 31 to less than that in chamber 11, whereupon diaphragm 31 and plunger 28 are urged upwardly, compressing spring 44, until bib washer 29 closes port 13 and opens port 20. The valve is then in the position shown in FIGURE 3. Accordingly, hard water then flows from chamber 18 through port 20 into chamber 21 and also through passage 72 to inlet chamber 70. Should any water be needed for service during the period of regeneration it may still be withdrawn from port 22 which remains connected with chamber 21, though of course, such water will be untreated. Water from inlet chamber 70 passes through filter 72 and inlet passages 71 to nozzle chamber 61. Since solenoid B is inactive, the water from chamber 70 enters nozzle passages 66 and 67 whence it passes therefrom to throat 53, thus creating a partial vacuum in suction chamber 56. Brine from the brine tank is accordingly drawn up brine line 59 to chamber 56 through port 58 and inlet passage 58′, valve 60 of course being open. The mixture of brine and water emerges from throat 53 and is carried by passages 51 and 52 to chamber 24, whence it is carried to the bottom of the mineral tank and flows upwardly therethrough to exchange its sodium ions for the calcium and magnesium ions of the zeolite. The mixture of hard water and the effluvient brine emerges from the top of the mineral tank and enters chamber 11 through port 17 and its connecting passageway 17′. From chamber 11 the waste water flows to drain 39 by means of passages 45, 46, chamber 40, passage 36 and drain valve 38.

c. *Fast rinse.*—The flow path through the valve during fast rinse is also indicated by the broken arrows in FIGURES 1 and 3, and the position of bib washer 29 is also that shown in FIGURE 3. After a predetermined amount of brine has been withdrawn from the brine tank, the brine valve therein closes thus shutting off the supply of brine to suction chamber 56. Approximately 45 minutes thereafter solenoid B is energized by the timing mechanism, raising nozzle 64 off its seat 62 (FIGURE 2) and thus bypassing nozzle passages 66 and 67. The flow through throat 53 to chamber 24 and up through the mineral tank is accordingly increased over that during the regenerative cycle. The constriction afforded by throat 53 is greater than that of orifice 63, but only enough so that a suitable pressure drop in the fast rinse water occurs between suction chamber 56 and the mineral tank. Accordingly, the rate of flow through the latter is restrained so that the mineral therein is not violently agitated or disturbed. At the same time, since full line pressure is thus not present in the mineral tank, air trapped in the water above throat 53 is released therefrom, owing to the pressure drop caused by throat 53, to produce a controlled expansion of the mineral bed for increased fast rinse efficiency.

After a predetermined period of fast rinse solenoids A and B are deactivated, thus closing drain valve 38 and the fast rinse bypass through orifice 63. The closing of drain valve 38 causes pressure to build up in chambers 11 and 43 on each side of diaphragm 31 and in the mineral tank until it equals that in chamber 18, whereupon spring 44 acts to move diaphragm 31 and plunger 28 downwardly to open port 13 and close port 20, thus returning the valve and flow through the mineral tank to normal service.

While the present invention has been described with reference to particular embodiments and detailed descriptive language has been used, it is not so limited. Instead, the following claim is to be read as encompassing such modifications and adaptations of the invention as would ordinarily occur to one in the art.

I claim:
In a fluid treatment control assembly, said assembly having an untreated fluid inlet passage, an untreated fluid outlet passage communicable with said inlet passage, a treated fluid passage, an injector passage communicable at its upstream end with said untreated inlet passage and at its downstream end with said treated fluid passage, main valve means operable to one position to permit flow of fluid from said untreated inlet passage to said untreated outlet passage and prevent flow from said untreated inlet passage to said injector passage and to a second position to permit flow of fluid from said untreated inlet passage to said injector passage and prevent flow from said untreated inlet passage to said untreated outlet passage, an injector including a nozzle and a throat, said injector being operatively mounted in said injector passage to form a suction chamber between said nozzle and throat when fluid flows from said untreated inlet passage through said injector to said treated fluid passage, and a regenerative fluid inlet passage operatively communicating with said chamber, the combination therewith of means providing a bypass of said nozzle for fast rinse fluid, said means including a nozzle chamber forming a portion of said injector passage upstream of said suction chamber and spacedly surrounding said nozzle, said chamber normally communicating with the upstream end of the nozzle passage and having a valve seat at its downstream end, said nozzle carrying closure means normally operatively engaging said seat in order to permit flow of fluid between said nozzle and suction chambers only through said nozzle passage and being movable in said chamber to a bypass position disengaging said closure means from said seat, the orifice provided by said seat and the movement of said nozzle being sufficient to provide a rate of fluid flow directly between said nozzle and suction chambers greater than provided through said nozzle passage, the orifice provided by said throat having a restriction to fluid flow greater than that of the orifice of said seat, and means to move said nozzle to said position.

References Cited by the Examiner
UNITED STATES PATENTS

| | | | |
|---|---|---|---|
| 1,969,790 | 8/1934 | Flora | 103—262 |
| 2,360,733 | 10/1944 | Smith. | |
| 3,007,495 | 11/1961 | Whitlock | 137—604 X |

ISADOR WEIL, *Primary Examiner.*
WILLIAM F. O'DEA, *Examiner.*